(12) United States Patent
Bae et al.

(10) Patent No.: US 6,421,695 B1
(45) Date of Patent: Jul. 16, 2002

(54) APPARATUS FOR IMPLEMENTING INVERSE DISCRETE COSINE TRANSFORM IN DIGITAL IMAGE PROCESSING SYSTEM

(75) Inventors: Seong Ok Bae, Kyungki-Do; Seung Jai Min, Seoul, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/208,640

(22) Filed: Dec. 10, 1998

Related U.S. Application Data

(63) Continuation-in-part of application No. 08/740,310, filed on Oct. 28, 1996, now abandoned.

(30) Foreign Application Priority Data

Oct. 28, 1995 (KR) .............................................. 95-37892

(51) Int. Cl.[7] .............................................. G06F 17/14
(52) U.S. Cl. ...................................................... 708/402
(58) Field of Search ................................. 708/400–402

(56) References Cited

U.S. PATENT DOCUMENTS

| | | | |
|---|---|---|---|
| 5,301,136 A | 4/1994 | Mcmillan, Jr. et al. | |
| 5,345,408 A | 9/1994 | Hoogenboom | |
| 5,471,412 A | 11/1995 | Shyu | |
| 5,576,958 A | * 11/1996 | Kawakatsu et al. | 708/402 |
| 5,594,678 A | 1/1997 | Jones et al. | |
| 5,636,152 A | * 6/1997 | Yang et al. | 708/401 |
| 5,701,263 A | 12/1997 | Pineda | |
| 5,883,823 A | * 3/1999 | Ding | 708/402 |
| 6,167,092 A | * 12/2000 | Lengwehasetit | 708/402 |

* cited by examiner

Primary Examiner—Tan V. Mai
(74) Attorney, Agent, or Firm—Birch, Stewart, Kolasch & Birch, LLP

(57) ABSTRACT

An apparatus for a fast inverse discrete cosine transform (IDCT) by processing only non-zero IDCT input data including non-zero feeding unit connected to each row-column decomposed one dimensional IDCT input for feeding only non-zero input data during each cycle. The first 1-D IDCT and the second 1-D IDCT have the same structure, and 1-D IDCT core with a non-zero feeding unit at its front end. The 1-D IDCT core of the present invention is for performing IDCT operation based on the input scaling method, and the operation of the IDCT core consists of a cosine kernel selection operation using a received non-zero input, multiplication-and-addition, and a storing operation. The non-zero feeding unit for the first 1-D IDCT and the second one are different in their configuration. There are two different methods for implementing the first 1-D IDCT, a stored input feeding method and a zigzag scanned input feeding method. The zigzag scanned input method enables the first 1-D IDCT to get rid of its input memory for storing the IDCT input data.

27 Claims, 13 Drawing Sheets

FIG. 2
CONVENTIONAL ART $$C \times X = Y$$

j-th COSINE COEFFICIENT VECTOR:

$$C = \begin{Bmatrix} C_{00} & C_{01} & C_{02} & \cdots & \cdots & C_{0,N-1} \\ C_{10} & C_{11} & C_{12} & \cdots & \cdots & C_{1,N-1} \\ C_{20} & C_{21} & C_{22} & \cdots & \cdots & C_{2,N-1} \\ \cdots & \cdots & \cdots & & & \cdots \\ C_{N-1,0} & C_{N-1,1} & C_{N-1,2} & \cdots & \cdots & C_{N-1,N-1} \end{Bmatrix}$$

k-th INPUT COEFFICIENT VECTOR:

$$X = \begin{Bmatrix} X_{00} & X_{01} & X_{02} & \cdots & \cdots & X_{0,N-1} \\ X_{10} & X_{11} & X_{12} & \cdots & \cdots & X_{1,N-1} \\ X_{20} & X_{21} & X_{22} & \cdots & \cdots & X_{2,N-1} \\ \cdots & \cdots & \cdots & & & \cdots \\ X_{N-1,0} & X_{N-1,1} & X_{N-1,2} & \cdots & \cdots & X_{N-1,N-1} \end{Bmatrix}$$

AN OUTPUT $Y_{jk}$ VECTOR:

$$Y = \begin{Bmatrix} Y_{00} & Y_{01} & Y_{02} & \cdots & Y_{0,N-1} \\ Y_{10} & Y_{11} & Y_{12} & \cdots & Y_{1,N-1} \\ Y_{20} & Y_{21} & Y_{22} & \cdots & Y_{2,N-1} \\ \cdots & \cdots & \cdots & & \cdots \\ Y_{N-1,0} & Y_{N-1,1} & Y_{N-1,2} & \cdots & Y_{N-1,N-1} \end{Bmatrix}$$

FIG. 4

SELECT u-th COLUMN VECTOR → $\begin{pmatrix} C_{00} & C_{01} & C_{02} & \cdots & C_{0,N-1} \\ C_{10} & C_{11} & C_{12} & \cdots & C_{1,N-1} \\ C_{20} & C_{21} & C_{22} & \cdots & C_{2,N-1} \\ \vdots & \vdots & \vdots & & \vdots \\ C_{N-1,0} & C_{N-1,1} & C_{N-1,2} & \cdots & C_{N-1,N-1} \end{pmatrix}$

C

CURRENT INPUT $X_{uv}$ → $X_{12}$ $\begin{pmatrix} X_{00} & X_{01} & X_{02} & \cdots & X_{0,N-1} \\ X_{10} & X_{11} & X_{12} & \cdots & X_{1,N-1} \\ X_{20} & X_{21} & X_{22} & \cdots & X_{2,N-1} \\ \vdots & \vdots & \vdots & & \vdots \\ X_{N-1,0} & X_{N-1,1} & X_{N-1,2} & \cdots & X_{N-1,N-1} \end{pmatrix}$

X

=

STORE AT v-th COLUMN VECTOR → $\begin{pmatrix} Y_{00} & Y_{01} & Y_{02} & \cdots & Y_{0,N-1} \\ Y_{10} & Y_{11} & Y_{12} & \cdots & Y_{1,N-1} \\ Y_{20} & Y_{21} & Y_{22} & \cdots & Y_{2,N-1} \\ \vdots & \vdots & \vdots & & \vdots \\ Y_{N-1,0} & Y_{N-1,1} & Y_{N-1,2} & \cdots & Y_{N-1,N-1} \end{pmatrix}$

Y

=

FIG. 10A
FIG. 10B
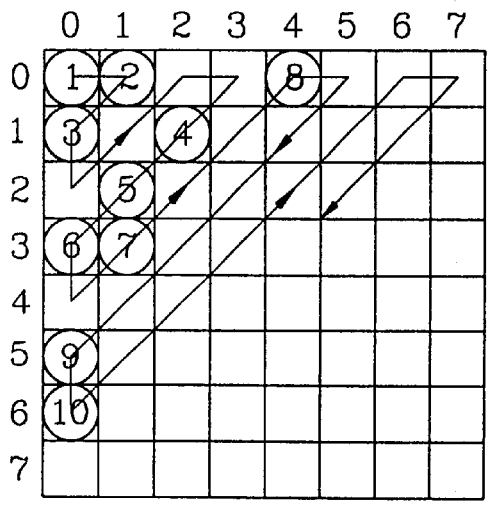
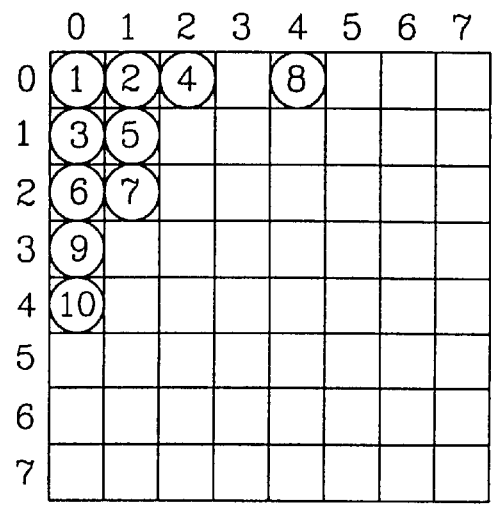
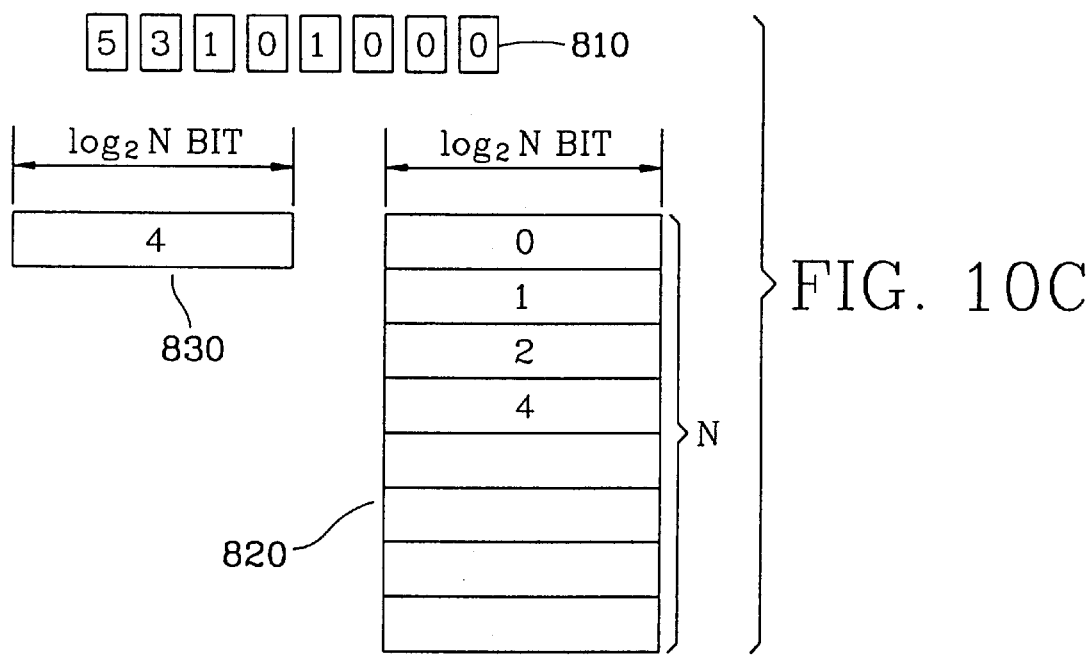
FIG. 10C

APPARATUS FOR IMPLEMENTING INVERSE DISCRETE COSINE TRANSFORM IN DIGITAL IMAGE PROCESSING SYSTEM

This application is a continuation-in-part of Ser. No. 08/740,310 filed Oct. 28, 1996 now abandoned.

BACKGROUND OF THE INVENTION

1. Field of the Invention

The present invention relates to the implementation of an inverse discrete cosine transform (IDCT) in digital image processing systems, and more particularly, to an improved implementation of two-dimensional IDCT without zero-stuffing to accelerate the processing time of inverse discrete cosine transform.

2. Description of the Background Art

FIG. 1 is a flow chart showing a typical digital image decoding process in a digital image processing system. As shown in FIG. 1, the prior stages of IDCT are inverse quantization and inverse zigzag scanning and, in most implementations, the inverse zigzag scanning is carried out as an output stage of the inverse quantization. The present invention is theoretically based on the non-zero input characteristic of inverse discrete cosine transform. The non-zero input characteristic represents the fact that the IDCT input has many zero-valued data. This is because the discrete cosine transform (DCT) and the quantization operation in the digital image encoding system convert many non-zero data into zero data to reduce the data size of the encoded bit-stream. The compressed bit-stream is an input to a decoding system. A VLD (Variable Length Decoder) and an inverse quantizer with inverse zigzag scanning deal with the encoded bit-stream and it is the input of the IDCT where zero data is reconstructed. There are many zero elements in the N×N IDCT input block. These zero-valued data are created by zero stuffing operation using the position information, which is obtained by inverse zigzag scanning.

It is known that there are two different methods (A) and (B) for implementing IDCT.

(A) The first IDCT method allows a simple and regular structure for implementing 2-dimensional (2-D) IDCT by decomposing it into two one-dimensional IDCTs. A matrix form for implementing N×N 2-D IDCT will be written as following equation (1):

$$Z_{jk} = \frac{2}{N} \sum_{u=0}^{N-1} \sum_{v=0}^{N-1} C_u C_v X_{uv} \cos\left[\frac{(2j+1)u\pi}{2N}\right]\left[\frac{(2k+1)v\pi}{2N}\right] \quad (1)$$

Here, u, v, j and k equal 0, 1, . . . , (N−1), and $Z_{jk}$ denotes the j-th row, k-th column element in an output matrix of the 2-D IDCT, $X_{uv}$ represents u-th row, v-th column element in an input matrix X of the 2-D IDCT, and Cu and Cv represent elements in a cosine kernel matrix C of the IDCT.

The 2-D IDCT can be separated into two 1-D IDCTs, which is shown in a matrix form as following equation (2):

$$Z = CXC^T = YC^T = (CY^T)^T \quad (2)$$

Here, "Z" represents an output matrix of the 2-D IDCT. The notation "CX" is a matrix multiplication, where "C" represents a cosine kernel matrix of the IDCT, and "X" represents an input matrix of the first 1-D IDCT, and "Y" matrix represents an input matrix of the second 1-D IDCT. The matrix Y is obtained as a result of the first matrix multiplication CX and is transposed in order to make the same matrix multiplication form as the matrix multiplication CX. Then, the transposed matrix Y becomes the input matrix of the second 1-D IDCT.

FIG. 2 shows a matrix multiplication form CX=Y in 1-D IDCT operation according to the conventional art, wherein the notation "C" represents a cosine kernel matrix, "X" represents input data matrix, and "Y" represents an output data matrix where each element is obtained by the inner product of the corresponding column and row in matrixes C and X. The matrix multiplication CX of the 1-D IDCT focuses on how to generate an output element $Y_{jk}$ and requires N input elements and N cosine coefficients simultaneously. The N input elements and the N cosine coefficients are multiplied respectively and N multiplication outputs are obtained. These N multiplication outputs are added to generate an output element $Y_{jk}$. All N input elements are required to make the output element $Y_{jk}$.

(B) Second IDCT method considers the non-zero input characteristic in the IDCT input domain. It is apparent that there are many zero elements in the IDCT input domain since IDCT input is a compressed DCT coefficient.

According to the widely accepted standards, such as MPEG, it is known that there are many zero elements in the IDCT input. These zero elements are added into the IDCT input after performing inverse zigzag scanning, however if zero data are present in the IDCT input data, it is difficult to skip the zero data in reading only non-zero data from an IDCT input memory. The inverse zigzag scanning operation is to find a relative position of the inverse quantized data. These inverse quantized data are placed in the IDCT input memory using the position information and the rest of the input memory where non-zero data are not occupied are filled with zeros, which we dubbed this operation zero-stuffing.

In one type of technique, the non-zero processing is applied to two-dimensional IDCT directly. This kind of 2-D direct implementation also aims at fast IDCT computation, however, the 2-D direct implementation requires complex interconnection between multipliers and an accumulator array and large hardware cost such as N×N accumulator array.

In another technique, a zero input detector is used to inactivate the controllable multiply-addition operation when the input data value is detected as a zero. In other words, this IDCT technique reads all input elements one by one and the zero input detector determines whether each input element is zero or not and generates a control signal to a controllable multiply-addition unit. The multiply-addition unit is performed only when the control signal tells that the input data value is a non-zero. If there are M non-zero input elements in the N×N input data block, this technique consumes $N^2$ cycles to read $N^2$ input elements. Among $N^2$ cycles, the IDCT operation including multiply operation and addition operation will be activated for M cycles when non-zero elements are processed. This technique has an ability to selectively processing only non-zero inputs. However, it needs a plenty of time for reading all IDCT input elements to determine whether they are zero or not, whereas the IDCT input characteristic refers to the fact that the value zeros are widely distributed in the input data of the IDCT.

SUMMARY OF THE INVENTION

Therefore, it is an object of the present invention to carry out a 1-D IDCT using non-zero input data being applied without a zero stuffing.

It is another object of the present invention to selectively process non-zero input data so as to perform 1-D IDCT during cycles corresponding to the number of non-zero elements among the input data.

To achieve the above-described objects, there is provided an apparatus for implementing inverse discrete cosine transform in a digital image processing system according to the present invention which includes a first non-zero feeding unit for storing therein a first position information of an inverse zigzag scanned non-zero input data, a second non-zero feeding unit for receiving the first position information and storing therein a second position information, a 1-D IDCT core for receiving the inverse zigzag scanned non-zero input data and performing the 1-D IDCT operation in accordance with the first or second position information, and a memory unit for storing therein the 1-D IDCTed data value.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein:

FIG. 2 illustrates a matrix multiplication form CX=Y in a 1-D IDCT operation according to the conventional art;

FIG. 4 illustrates a matrix multiplication form CX=Y for input scaling in a 1-D IDCT operation according to the present invention;

FIGS. 10A and 10B illustrate a matrix form of a zigzag-scanned non-zero input data input and stored in an input memory in FIG. 9;

FIG. 10C illustrates values stored in a column counter, an index register, and an index counter in FIG. 9;

DETAILED DESCRIPTION OF THE PREFERRED EMBODIMENTS

Figure 1:
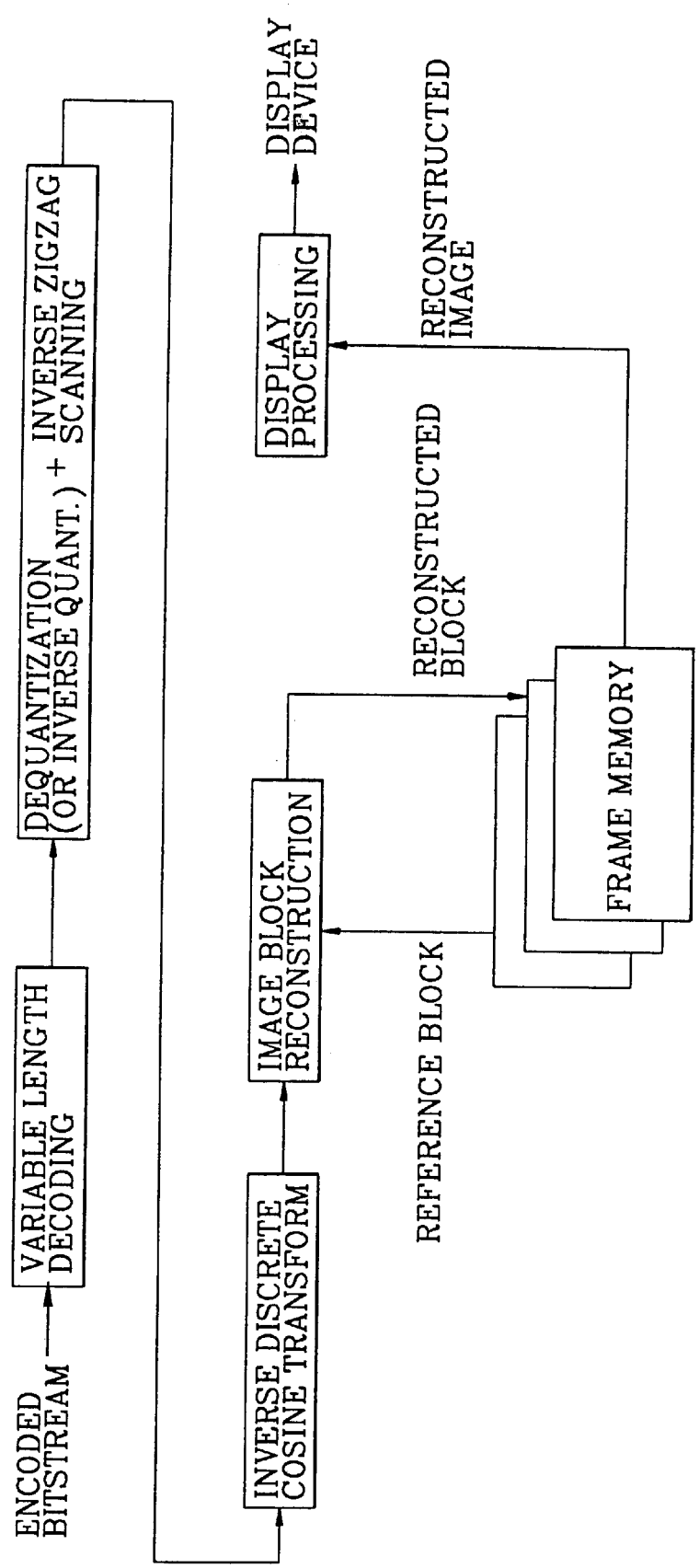
FIG. 1 is a flow chart illustrating a typical digital image decoding process in a digital image processing system.
Figure 3:
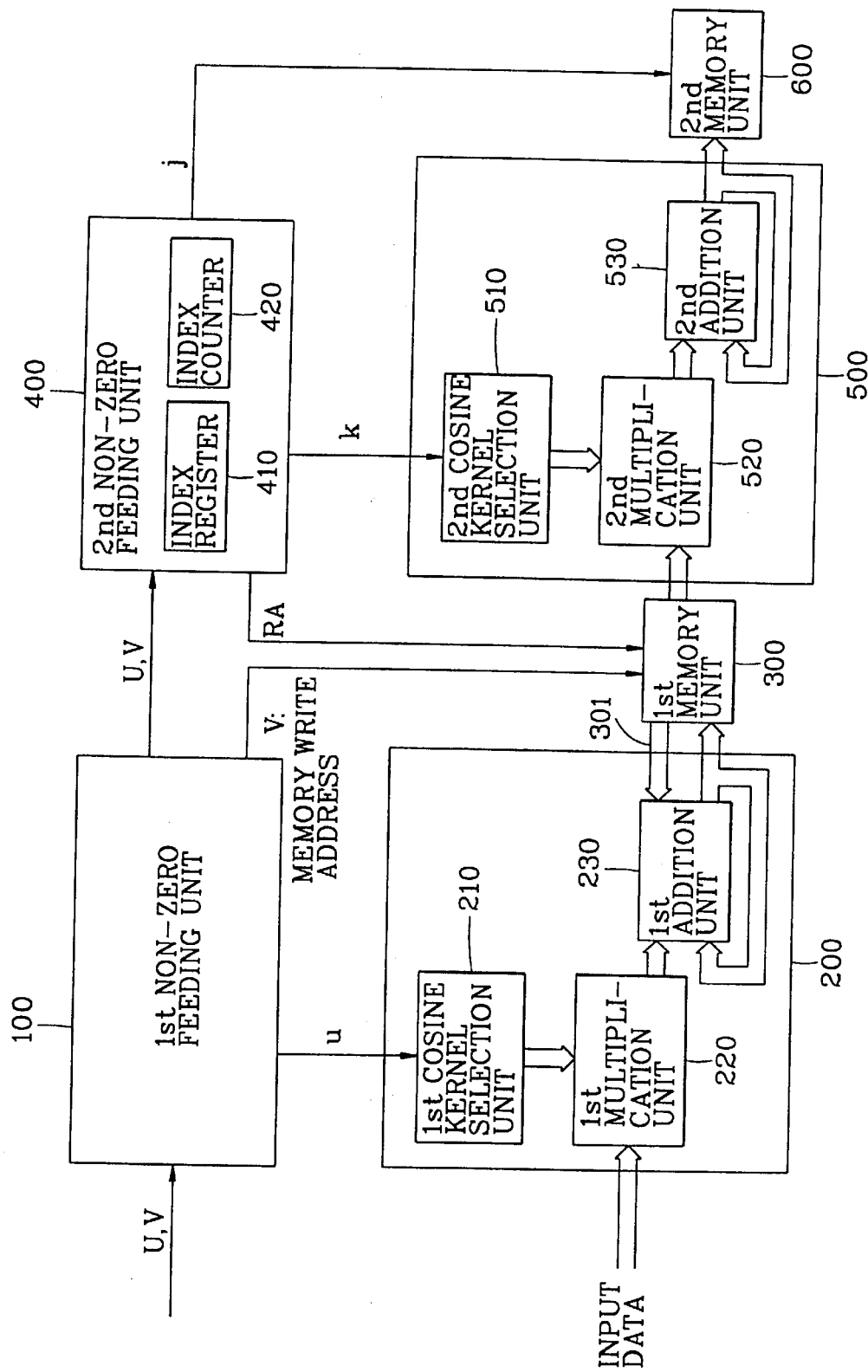
FIG. 3 is a block diagram illustrating an apparatus for performing an IDCT according to a first embodiment of the present invention.

FIG. 3 is a block diagram illustrating an apparatus for implementing IDCT according to the first embodiment of the present invention.

As shown therein, a first non-zero feeding unit 100 stores therein first position information of inverse zigzag scanned non-zero input data. A first 1-D IDCT core 200 directly receives the inverse zigzag scanned non-zero input data and implements the first 1-D IDCT based on the first position information. A first memory unit 300 stores therein first 1-D IDCTed values in a matrix form. A second non-zero feeding unit 300 receives the first position information from the first non-zero feeding unit 100 and stores therein a second position information. A second 1-D IDCT core 500 receives the first 1-D IDCTed data values and implements a second 1-D IDCT based on the second position information. A second memory unit 600 stores therein the second 1-D IDCTed data values.

The first 1-D IDCT core 200 sequentially receives a plurality of zigzag scanned non-zero input data one by one from an inverse quantizer (not shown). The first non-zero feeding unit 100 receives position information u, v of the input data. Here, u denotes vertical position information, and v denotes horizontal position information. For convenience' sake in discussion, the first 1-D IDCT is carried out in accordance with vertical position information u, and the second 1-D IDCT is carried out in accordance with horizontal position information v, and the case to the contrary is also possible for convenience of design.

Prior to discussing the operation according to the construction of FIG. 3, the IDCT concept according to the present invention will be described with reference to FIG. 4.

FIG. 4 shows a matrix multiplication form CX=Y for input scaling in 1-D IDCT operation according to the present invention, wherein the notation "C" represents cosine kernel matrix, "X" represents a matrix form of input data for input scaling, and "Y" represents a matrix form of output data according to an inner product "CX". The inner product CX focuses on an input element $X_{uv}$. In view of the input $X_{uv}$, only the u-th column of the cosine kernel matrix C will be multiplied and other columns have nothing to do with input $X_{uv}$. And the multiplication results will influence the v-th column of the output matrix Y and will not affect other columns. The v-th column of the output matrix Y is completed after all non-zero inputs in the v-th column of the input matrix X are processed. Thus, the multiplication results are partial outputs for the v-th column of the output matrix. The input scaling can be represented in equation form as follows:

$$Y_{nv}{}^u = C_{nu} X_{uv} (n=0,1,\ldots,N-1) \qquad (3)$$

Here, $X_{uv}$ is the non-zero input element of the 1-D IDCT, and $C_{nu}$ is an n-th element in the u-th column of the cosine kernel matrix C. The multiplication result, $Y^u_{nv}$ denotes the u-th partial output of the n-th element in the v-th column of the output matrix Y. The final 1-D IDCT output is obtained by accumulating these partial outputs as follows.

$$Y_{nv} = \sum_{u \in (X_{uv} \neq 0)} Y^u_{nu} \quad (4)$$

Here, $Y_{nv}$ is the n-th row, v-th column element of the 1-D IDCT output matrix Y. As shown in equation (4), plural multiply-addition operations are not performed sequentially from 0 to N−1 because those partial outputs generated by zero input elements do not need to be accumulated. Thus only the partial output $Y_{unv}$ which is generated by the non-zero element $X_{uv}$ is accumulated. Therefore, the number of multiply-addition operations is proportional to the number of non-zero elements in the input matrix. Consequently, if there are L(L≦N) non-zero elements in the v-th column of the input matrix, then the required cycle time to obtain complete v-th column of the 1-D IDCT output matrix is L cycles, not N cycles. Also if there are total M non-zero elements in the N×N input matrix, then the total processing time for performing 1-D IDCT is M cycle times, not $N^2$ cycle times. The input scaling method is named after the fact that the cosine kernel vector is scaled by the input element $X_{uv}$ through multiplication. Contrary to the 1-D IDCT operation as shown in FIG. 2, which requires all $N^2$ input elements, the input scaling method enables the 1-D IDCT core to operate on individual non-zero input element.

The operation of the IDCT according to the first embodiment of the present invention will now be discussed with reference to FIGS. 5A through 6D.

Figure 5A:
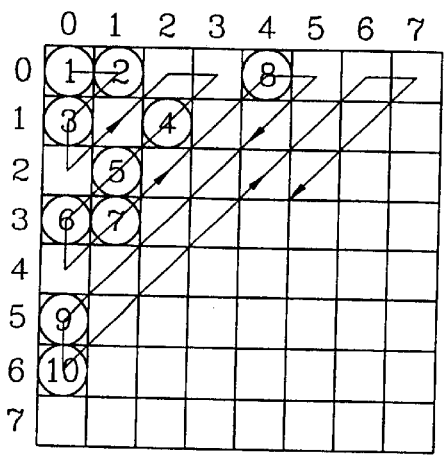
FIG. 5A illustrates a matrix form of zigzag-scanned non-zero input data from a first 1-D IDCT core in FIG. 3.

FIG. 5A shows a matrix form of zigzag scanned non-zero input data received to the first 1-D IDCT core 200. As shown therein, for convenience' sake in discussion, it is assumed that 10 non-zero input data exist among 64 elements in the 8*8 matrix. The order of IDCT non-zero inputs ranging from 1 to 10 are represented in circles. Arrows are also drawn to show the sequence of zigzag scanning.

The first 1-D IDCT core 200 performs the first 1-D IDCT with regard to the zigzag scanned non-zero input data and includes a first cosine kernel select unit 210 storing a cosine kernel matrix therein, a first multiplication unit 220 multiplying respective elements of the zigzag scanned non-zero input data and each elements in the cosine kernel matrix, and a first addition unit 230 adding the multiplied value and the value multiplied in the previous step.

The operation of the first 1-D IDCT will be explained in the order of columns.

The first non-zero feeding unit 100 outputs a vertical position information u which corresponds to the first input data $X_{00}$, that is, ①. The first cosine kernel select unit 210, when the vertical position information u is input, selects the first column of the cosine kernel matrix, and the cosine kernel elements in the selected column are simultaneously output to the first multiplication unit 220.

Meanwhile, according to the characteristics of the cosine kernel matrix, if the number of entire elements in a column is N, since the number N/2 in an upper portion in the column is symmetric to the number N/2 in a lower portion in the column, the N/2 elements which are the half thereof are stored and output the N/2 element. Here, the number N in one column is 8 so that the stored number is 4.

In the multiplication unit 220, the first input data $X_{00}$ and the cosine kernel elements in the column of the first cosine kernel select unit 210 are multiplied and the multiplied values are stored in the first addition unit 230, whereby the first 1-D IDCT with regard to the first column of the cosine kernel matrix is implemented.

The multiplied values are stored in 8 storage locations in the first addition unit 230 and stored in the respective memories of the first memory unit 300. The location for the storage is designated by the horizontal position information v from the first non-zero feeding unit 100. Here, the horizontal position information v serves as write address.

Figure 5B:
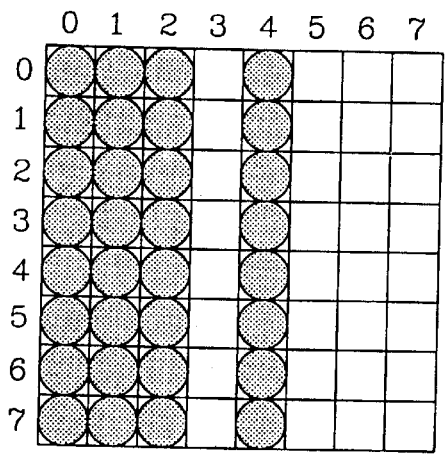
FIG. 5B illustrates a matrix form of data stored in a first memory unit in FIG. 3.

FIG. 5B shows the type of data being stored in the first memory unit 300, wherein the resultant data stored in accordance with the input data ① are elements in a first column.

When the operation with regard to the first input data ① is completed, the first non-zero feeding unit 100 outputs the vertical position information u which corresponds to the second input data $X_{01}$ ②. According to the vertical position information u, the first cosine kernel select unit 210 selects a first column of the cosine kernel matrix, and the cosine kernel elements in the selected column are outputted to the first multiplication unit 220. After multiplication and addition operation with regard to the second input data ② are performed, the multiplied respective resultant data are stored in the first addition unit 230 and stored in the respective memories of the first memory unit 300. Also, the location stored in the memory is designated by the horizontal position information v from the first non-zero feeding unit 100. The location corresponds to the elements of the second column data in FIG. 5B. Here, the horizontal position information v has a value different from that of the first input data ① so that it is known that the storage locations for the resultant data according to the first input data "①" and the second input data "②" are different from each other.

After the multiplication with regard to the third input data value $X_{01}$ "③" is performed, the resultant data are accumulated with the resultant data with regard to the first input data "①" in the first addition unit 230, that is, the respective data previously stored in the first column of the first memory unit 300. For that purpose, the first memory unit 300 feeds back the resultant data previously stored in the first column via the data bus 301 to the first addition unit 230. The accumulated respective values are stored in the first column of the first memory unit 300. Likewise, since the sequence of the IDCT operation does not follow the column order but follows the order of the zigzag scanned input data, the resultant data in the column that corresponds to the input data value being presently calculated are accumulated with those previously stored in the column.

The first column as shown in FIG. 5B is the result of the first 1-D IDCT with regard to the input data values "①", "③", "⑥", "⑨" and "⑩", the second column is the result of the 1-D IDCT with regard to the input data "②", "⑤" and "⑦", the third column is the result of the 1-D IDCT with regard to the input data "④", and the fifth column is the result of the 1-D IDCT with regard to the input data "⑧".

Figure 5C:
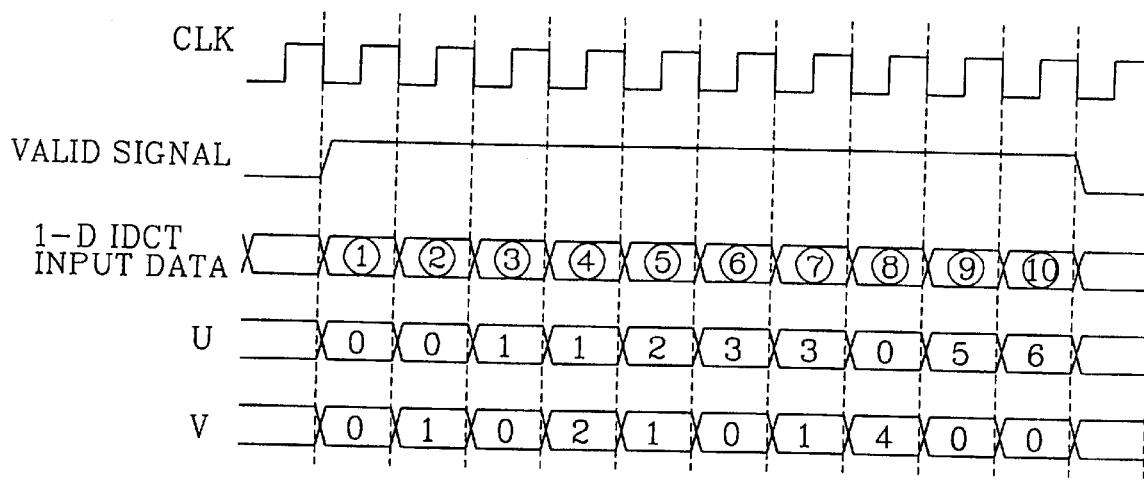
FIG. 5C illustrates respective timing diagrams with regard to respective signals in FIG. 3 during the implementation of the first 1-D IDCT according to the first embodiment of the present invention.

FIG. 5C shows timing waveforms illustrating how non-zero input data is fed to the first 1-D IDCT during the implementation of the first 1-D IDCT. Here, a valid signal indicates that incoming elements of the input data are valid data. The number indicated in position information "u" and "v" respectively represent the input data positions. According to the waveforms of the input data, only 10 non-zero input data among the entire 64 elements are continually calculated so that it takes 10 cycles for the entire calculation of the first 1-D IDCT.

Next, the second 1-D IDCT based on a row order will now be described.

Figure 6A:
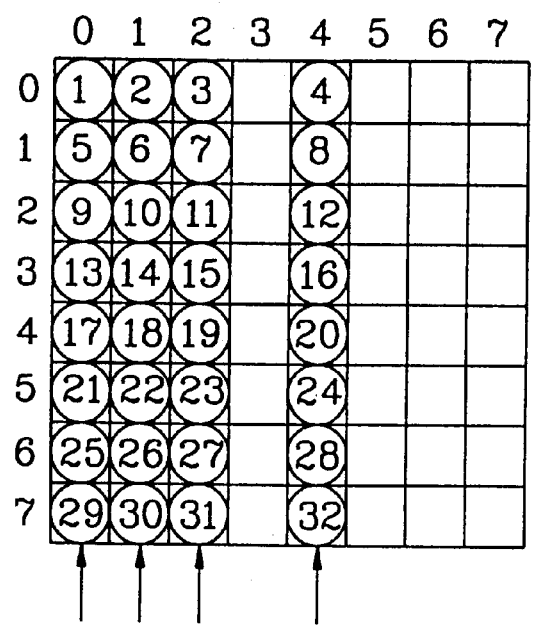
FIG. 6A illustrating a matrix form of data stored in the first memory unit in FIG. 3.
Figure 6B:
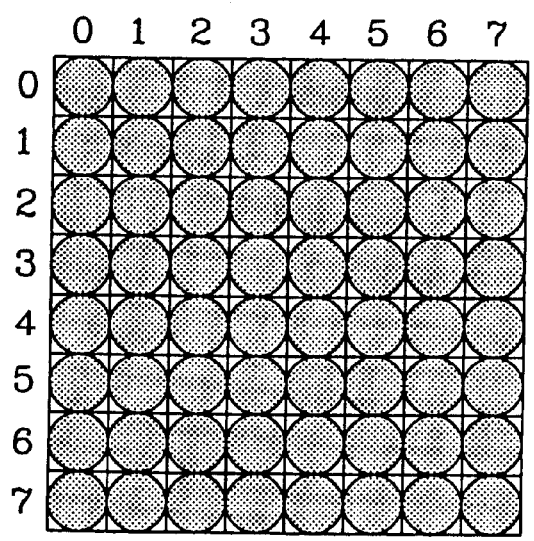
FIG. 6B illustrates a matrix form of data stored in a second memory unit in FIG. 3.

FIG. 6A shows a matrix form with regard to the data values for the second 1-D IDCT, that is, the data values stored in the first memory unit 300, which is basically identical to FIG. 5B. FIG. 6B shows data forms after the data stored in the second memory unit 500, that is, the second 1-D IDCT is completed.

The second non-zero feeding unit 400 includes an index register 410 and an index counter 420, and it receives position information u, v from the first non-zero feeding unit 100 and outputs a memory read address RA to the first memory unit 300 and also outputs the position information k to the second 1-D IDCT core 500.

In the index register 410, a column having data is provided with a corresponding number so as to indicate that data exists in the column. The index counter 420 informs column tip at which data exists, and represents the number of columns having data therein. That is, since the input data exists in the four index registers, a number "4" is stored in the index counter 420.

Figure 6C:
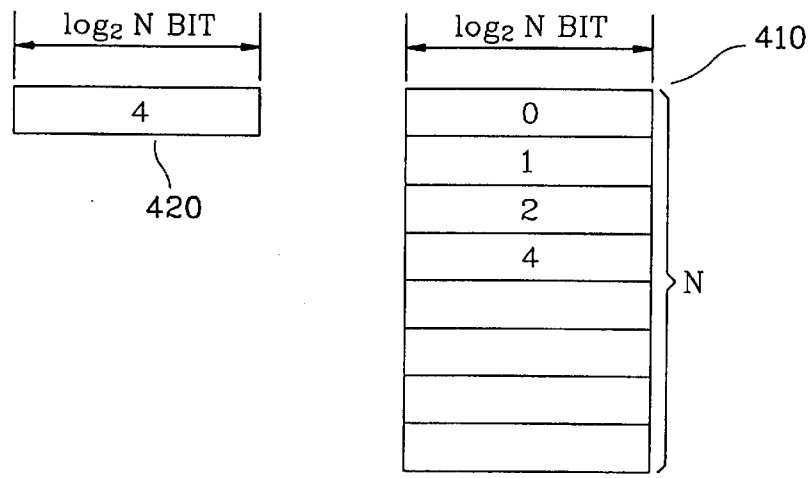
FIG. 6C illustrates values stored in an index register and an index counter in FIG. 3.

As shown in FIG. 6C, "0", "1", "2"and "4" are stored in the respective columns of the index register 410, and "4" is stored in the index counter 420.

The second 1-D IDCT core 500 includes a second cosine kernel select unit 510, a second multiplication unit 520, and a second addition unit 530, and the second 1-D IDCT is performed in a row sequence according to the second horizontal position information k, by use of the matrix values from the first memory unit 300 and the cosine kernel matrix values stored therein.

The operation is as follows.

The second non-zero feeding unit 400 checks the value "0" of the first register of the index register 410 and the resultant memory read address RA is outputted to the first memory unit 300. Accordingly, the resultant data stored in the first column of the first memory unit 300, that is, the first data "1" as shown in FIG. 6A is output.

The second cosine kernel select unit 510 outputs the cosine kernel elements in the column designated by the horizontal position information k. The second multiplication unit 520 multiplies the first data "①" with the cosine kernel elements from the second cosine kernel select unit 510 and the multiplied results are stored in a column position in the second addition unit 530, thereby performing the second 1-D IDCT with regard to the first column of the cosine kernel matrix. Here, the four column kernel elements and the input data value are respectively multiplied.

The multiplied values are stored in 8 storage locations in the second addition unit 530.

Next, the value "1" in the second register of the index register 410 is checked and the second data numbered by "②" is output from the first memory unit 300. The data "②" is multiplied to the second column elements of the cosine kernel matrix. The respective values are added to the respective values previously stored in the second addition unit 530.

With regard to the remaining data "③" and "④" in the first row as shown in FIG. 6A, the multiplication operation and the addition operation are performed, and then the "4" stored in the index counter 420 is checked, thereby completing the second 1-D IDCT with regard to the first row of second 1-D IDCT input matrix, whenever a last non-zero element in each row of the second 1-D IDCT input is processed, the accumulation results are stored at the second memory unit 600.

Figure 6D:
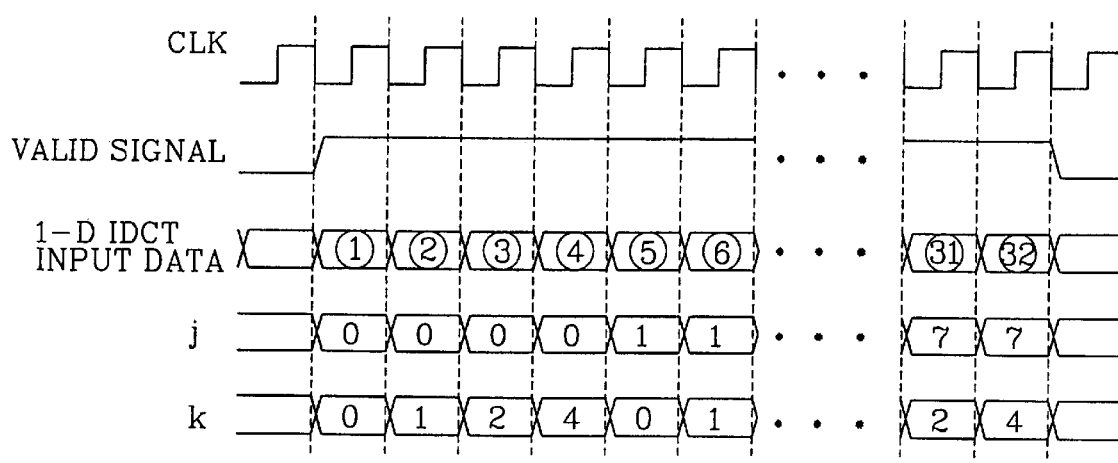
FIG. 6D illustrates respective timing diagrams with regard to respective signals in FIG. 3 during the implementation of a second 1-D IDCT according to the first embodiment of the present invention.

FIG. 6D shows timing waveforms illustrating how non-zero input data is fed to the first 1-D IDCT. As shown therein, the numbers indicated in the position information "j" and "k" represent the data locations for the second 1-D IDCT input matrix, respectively. According to the waveforms for the data, it is understood that 32 input data values are sequentially calculated, and since 32 non-zero inputs are considered among the entire 64 elements, it takes 32 cycles for the entire calculation time for the second 1-D IDCT.

Figure 7:
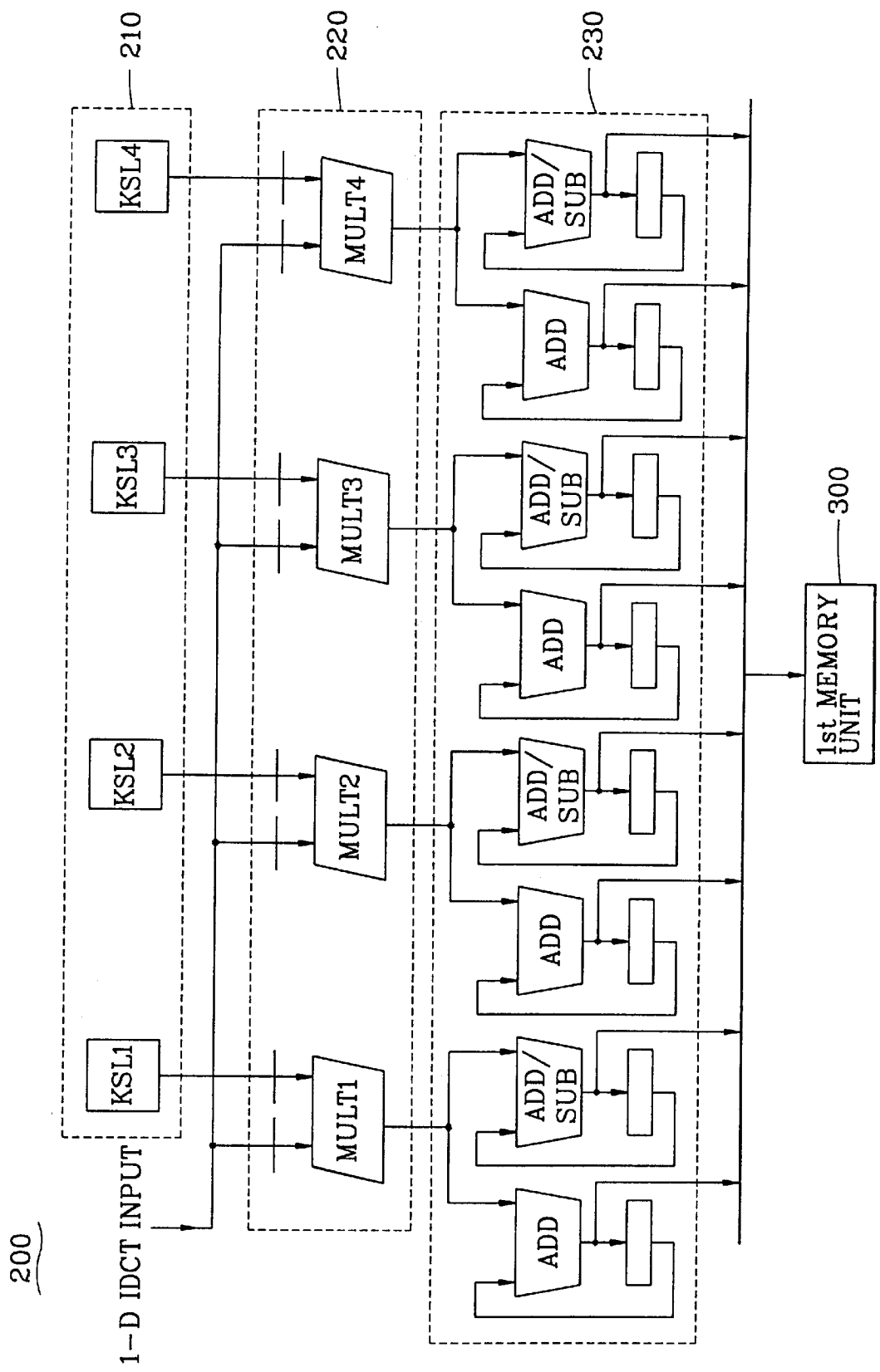
FIG. 7 illustrates a typical example of the first 1-D IDCT core implementation.

FIG. 7 shows a typical example of the first 1-D IDCT core implementation. The construction is similar to the IDCT core which has been conventionally employed. However, the difference is that only one input data value is used for the input.

According to the first embodiment of the present invention, the first 1-D IDCT is performed in the column order and the second 1-D IDCT is performed in the row order. However, the scope of the present invention is not limited to this since it is for convenience' sake in discussion. When required, the first 1-D IDCT may be performed in the row order and the second 1-D IDCT may be performed in the column order. This can be achieved by a simple modification of design.

In the first embodiment, the first 1-D IDCT core 200 and the second 1-D IDCT core 500 are identical in functionality with regard to the 1-D IDCT and in construction and accordingly if assigned a plurality of switching means, the first and second 1-D IDCTs can be performed using a single 1-D IDCT core.

Figure 8:
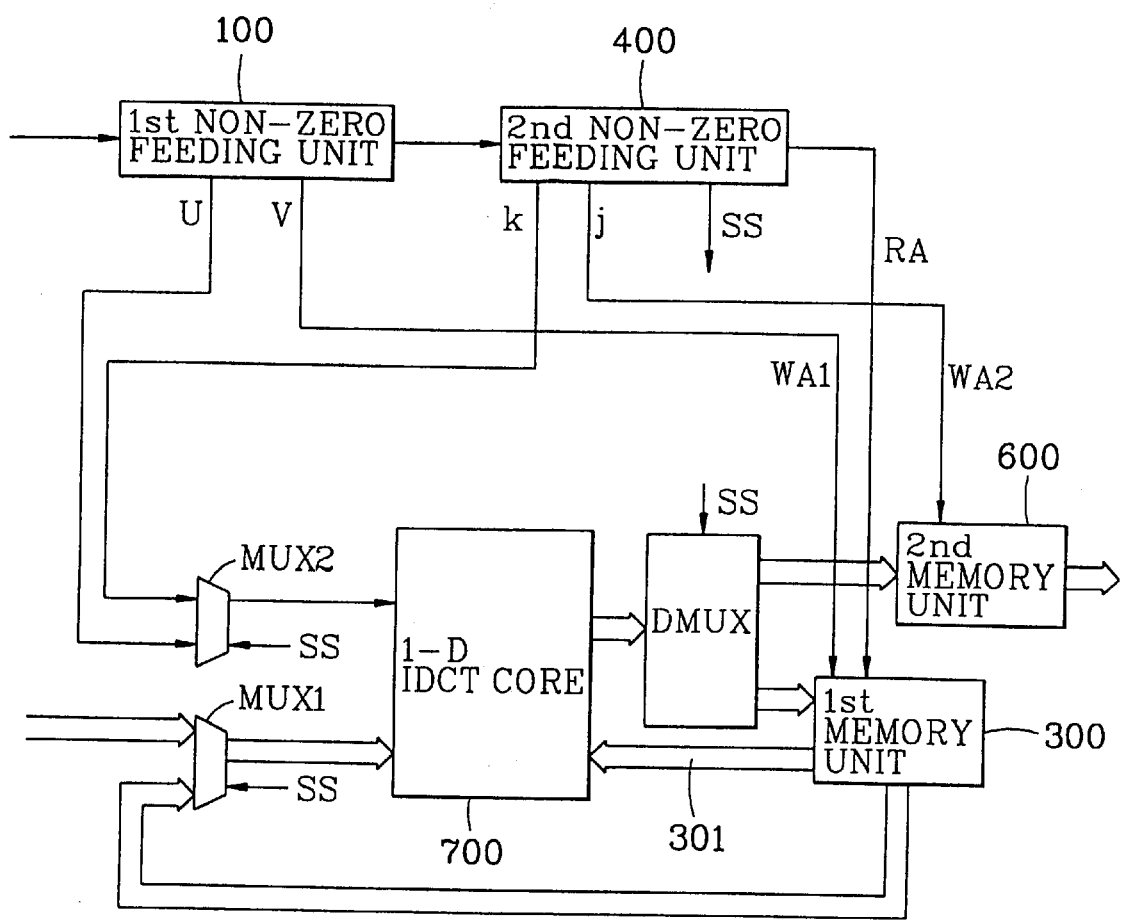
FIG. 8 is a block diagram for implementing IDCT according to a second embodiment of the present invention.

FIG. 8 is a block diagram illustrating an apparatus for implementing IDCT according to the second embodiment of the present invention. As shown therein, the apparatus includes a first non-zero feeding unit 100, a second non-zero feeding unit 400, a first memory unit 300, a second memory unit 600, a 1-D IDCT core 700 performing the first and second 1-D IDCTs, two multiplexers mux1 and mux2, and a demultiplexer DMUX. Here, the first nonzero feeding unit 100, second non-zero feeding unit 400, first memory unit 300 and second memory unit 600 are identical to those of the first embodiment in construction. The 1-D IDCT core 700 includes a cosine kernel select unit, a multiplication unit and an addition unit, and the respective operations thereof are identical to those of the first embodiment. The second non-zero feeding unit 400 outputs the select signal SS to the multiplexers mux1 and mux2, and the demultiplexer DMUX so as to determine whether to perform the first 1-D IDCT or the second 1-D IDCT. The first multiplexer mux1 selects, in accordance with the select signal SS, one of the inverse zigzag scanned non-zero input data and the first 1-D IDCTed resultant data from the first memory unit 300 and outputs the selected value to the 1-D IDCT core 700. The second multiplexer mux2 selects, in accordance with the select signal SS, one of the vertical position information "u" from the first non-zero feeding unit 100 and the horizontal position information "k" from the second non-zero feeding unit 400, and outputs the selected value to the cosine kernel selection unit in the 1-D IDCT core 700. The horizontal position information "v" from the first non-zero feeding unit 600 and the vertical position information "j" from the second non-zero feeding unit 400 are respectively inputted to the first and second memory units 300, 600 as a write address. The demultiplexer DMUX outputs, in accordance with the select signal SS, the matrix data value from the 1-D IDCT core 700 to the first memory unit 300 or to the second memory unit 600.

The inverse zigzag scanned non-zero input data is applied to the first multiplexer mux1, position information according to the input data is applied to the first non-zero feeding unit 100, and the position information is applied to the second non-zero feeding unit 400 via the first non-zero feeding unit 100. At this time, the second non-zero feeding unit 400 outputs the select signal SS having a predetermined level. In accordance with the select signal SS, the zigzag scanned non-zero input data is applied to the 1-D IDCT core 700 via the first multiplexer mux1 the vertical position information "u" from the first non-zero feeding unit 100 is applied to the 1-D IDCT core 700 through the second multiplexer mux2. The 1-D IDCT core 700 performs the first 1-D IDCT identical to the implementation in the first embodiment in accordance with the vertical position information "u" and outputs the resultant data. The demultiplexer DMUX outputs the resultant data to the first memory unit 300 in accordance with the select signal SS. During the implementation of the first 1-D IDCT, the first memory unit 300 feeds back the result data stored in the column to the 1-D IDCT core 700 through a data bus 301, and the 1-D IDCT core 700 performs the accumulation.

After the 1-D IDCT operation, the second non-zero feeding unit 400 outputs the select signal SS which corresponds to an inversion of the predetermined level. In response to the inverted select signal SS, the resultant data of the first 1-D IDCT from the first memory unit 700 is applied to the 1-D IDCT core via the first multiplexer mux1. When the 1-D IDCT core 700 performs the second 1-D IDCT, the accordingly resultant data is output to the second memory unit 600 via the demultiplexer DMUX.

The third embodiment of the present invention will now be described.

Figure 9:
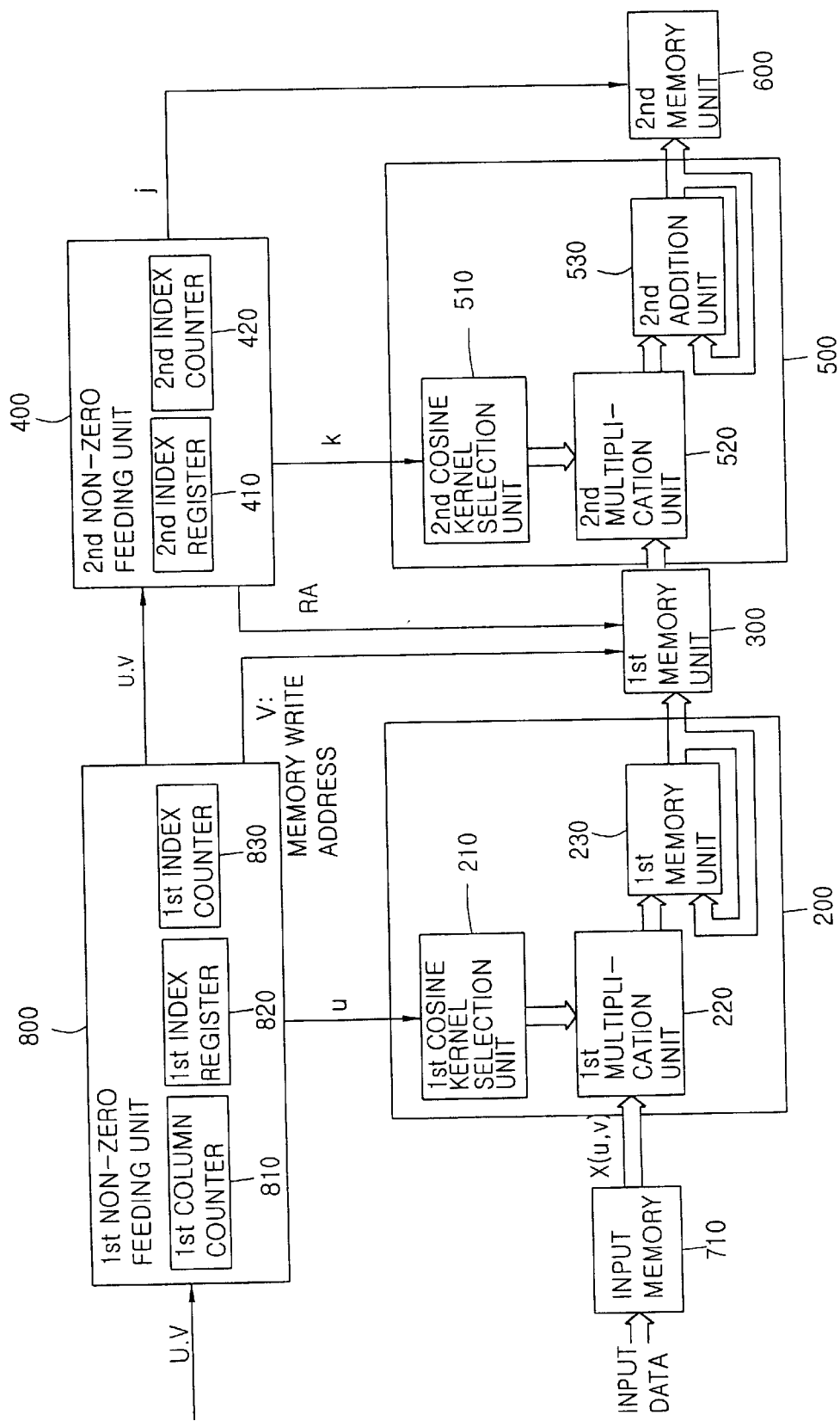
FIG. 9 is a block diagram for implementing IDCT according to a third embodiment of the present invention.

FIG. 9 is a block diagram illustrating an apparatus for implementing the IDCT operation. As shown therein, the apparatus includes the input memory 710 storing therein the zigzag scanned non-zero input data from the inverse quantizer (not shown) in the order of columns, a first and second non-zero feeding units 800, 400, a first and second 1-D IDCT cores 200, 500 and a first and second memory units 300, 600. Here, the first and second 1-D IDCT core 200, 500, and the first and second memory unit 300, 600 are identical to those of the first embodiment.

While the zigzag scanned non-zero input data in the first embodiment are applied to the first 1-D IDCT core 200 directly and the first 1-D IDCT core 200 performs the first 1-D IDCT in accordance with the position location of the input data, the input memory 710 is added in the third embodiment to store therein the zigzag scanned non-zero input data from the inverse quantizer in the order of columns. The input memory 710 outputs the non-zero input data stored therein one by one in the order of columns to the first 1-D IDCT core 200. In order for the first 1-D IDCT core 200 to perform the first 1-D IDCT, there is required information due to the sorting of the input data, and the information is received from the first non-zero feeding unit 800.

FIG. 10A shows a matrix form of a zigzag scanned non-zero input data outputted to the input memory 710, which is basically identical to the construction of FIG. 5A.

The 10 input data are sequentially stored into the input memory 710 as shown in FIG. 10B. In the first column, five input data "①", "③", "⑥", "⑨" and "⑩" are sequentially stored from the upper row. In the second column, three input data "②", "⑤" and "⑦" are sequentially stored. In the third column, an input data "4" is stored and in the fifth column an input data "⑧" is stored. Likewise the input data are sequentially stored from the upper row in the corresponding column.

The first non-zero feeding unit 800 stores therein position information u, v for performing the first 1-D IDCT operation and includes a plurality of first column counters 810, a first index register 820 and a first index counter 830.

As shown in FIG. 10C, the number of the first column counters 810 equals the number of columns in the input data matrix. The respective column counters have information as to how many input data exist in each of the respective columns. In the first column counter there is stored "5", in the second column counter there is stored "3", in the third column counter there is stored "1", in the fourth column counter there is stored "0", in the fifth column counter there is stored "1", and in the sixth to eighth column counters there are stored "0", respectively.

The respective functions of the first index register 820 and the first counter 830 are identical to those of the index register 410 and the index counter 420 in the first embodiment, and the values stored therein are also identical thereto. That is, in the respective columns of the first index register 820 there are stored "0", "1", "2" and "4", and in the first index counter 830 there is stored "4".

In the meantime, there is not required a data bus 301 connected to the first addition unit 230 of the first 1-D IDCT core 200 in the first memory unit 300 disclosed in the first embodiment of the present invention. This is because the operation is performed in the order of columns with regard to the input data and accordingly there is not required a feedback operation for an additional accumulation. The detail will be now discussed. Here, the operation for performing the second 1-D IDCT operation is identical to that of the first embodiment of the present invention.

The operation according to the third embodiment of the present invention will now be described.

In accordance with the vertical position information u from the first non-zero feeding unit 800, a column of a cosine kernel matrix within the first cosine kernel select unit 210 is designated and cosine kernel elements in the designated column are outputted. Here, the upper N/2 elements and the lower N/2 elements in one column of the cosine kernel matrix are symmetric to each other as in the first embodiment, so that the N/2 elements, that is, one half of the entire N elements are outputted. The first index value "0" in the first index register 820 is checked, whereby the first 1-D IDCT operation begins with regard to the first column.

The first multiplication unit 220 multiplies the first input data "①" and the first column elements in the cosine kernel matrix, and the multiplied values are stored in the 8 storage locations in the first addition unit 230 and at the same time stored in the respective memories of the first memory unit 300. Next, the first multiplication unit 220 performs the multiplication with regard to the second input data "③" and then the multiplied values are accumulated with the respective values previously stored in the respective locations of the first addition unit 230. Also, the accumulated values are stored in the respective memories in the first memory unit 300 in which the operation values according the first input data "①" have been stored.

When the first 1-D IDCT operation is performed with regard to all the five input data "①", "③", "⑥", "⑨" and "⑩", the number "5" stored in the first column counter 810 is checked and the first 1-D IDCT operation with regard to the first column of the input data is completed.

Next, the second index value "1" in the first index register 820 is checked. In processing the second column of the input memory, the non-zero input data "②", "⑤", and "⑦" are processed sequentially. Although these three input data are placed continuously, their position information are (0,1), (2,1), and (3,1) respectively. Therefore, the first, the third, and the fourth column of the cosine kernel are sequentially outputted from the kernel selection unit 210 and the accumulation results of respective multiplication are stored to the second column of the output memory 300.

The accumulation results are stored in the respective memories of the first memory unit 300. Here, the respective memories are different from the memories which store therein the accumulation results according to the operation of the first column operation. When the operation with regard to the second and third columns is completed, the third index value "4" of the first index register 620 is checked and the operation with regard to the fifth column is performed.

Since the first 1-D IDCT operation is performed with regard to the input data "⑧" in the fifth column of the input memory and the operation for the four columns corresponding to the number "4" stored in the first index counter 830 is performed, the entire first 1-D IDCT operation is completed. Meanwhile, at a time point when the first 1-D IDCT is completed, the data form stored in the first memory unit 300 is as shown in FIG. 5B and also identical to the data form according to the first embodiment.

Figure 10D:
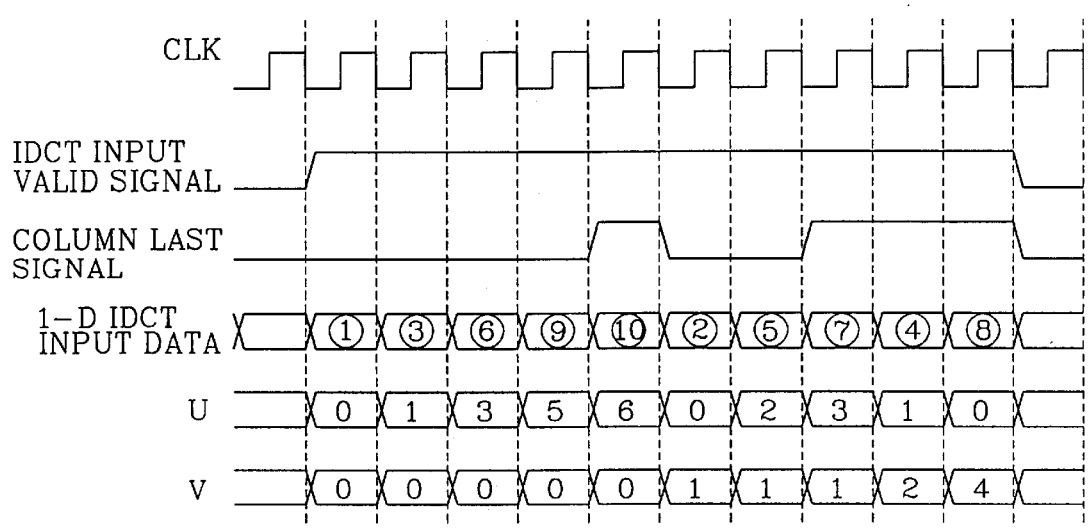
FIG. 10D is a timing waveforms illustrating respective signals during the implementation of the first 1-D IDCT according to the third embodiment of the present invention.

FIG. 10D illustrates timing waveforms to show how non-zero data is fed to the first 1-D IDCT during the first 1-D IDCT operation. As shown therein, a column last signal indicates the last non-zero element in the column, and the numbers indicated in the position information "u" and "v" represent input data positions. During the entire calculation time for the first 1-D IDCT operation, only 10 non-zero input elements among the entire 64 elements are considered and 10 cycles are taken in terms of time.

The second 1-D IDCT operation is performed in the order of rows and the operation is identical to that of the first embodiment of the present invention and accordingly its description will be omitted.

Next, the fourth embodiment of the present invention will now be described.

In the fourth embodiment, the first 1-D IDCT core 200 and the second 1-D IDCT core 500 are identical to each other in construction and performance and accordingly if assigned a plurality of switching means, the first and second 1-D IDCT operations can be preformed using one 1-D IDCT core.

Figure 11:
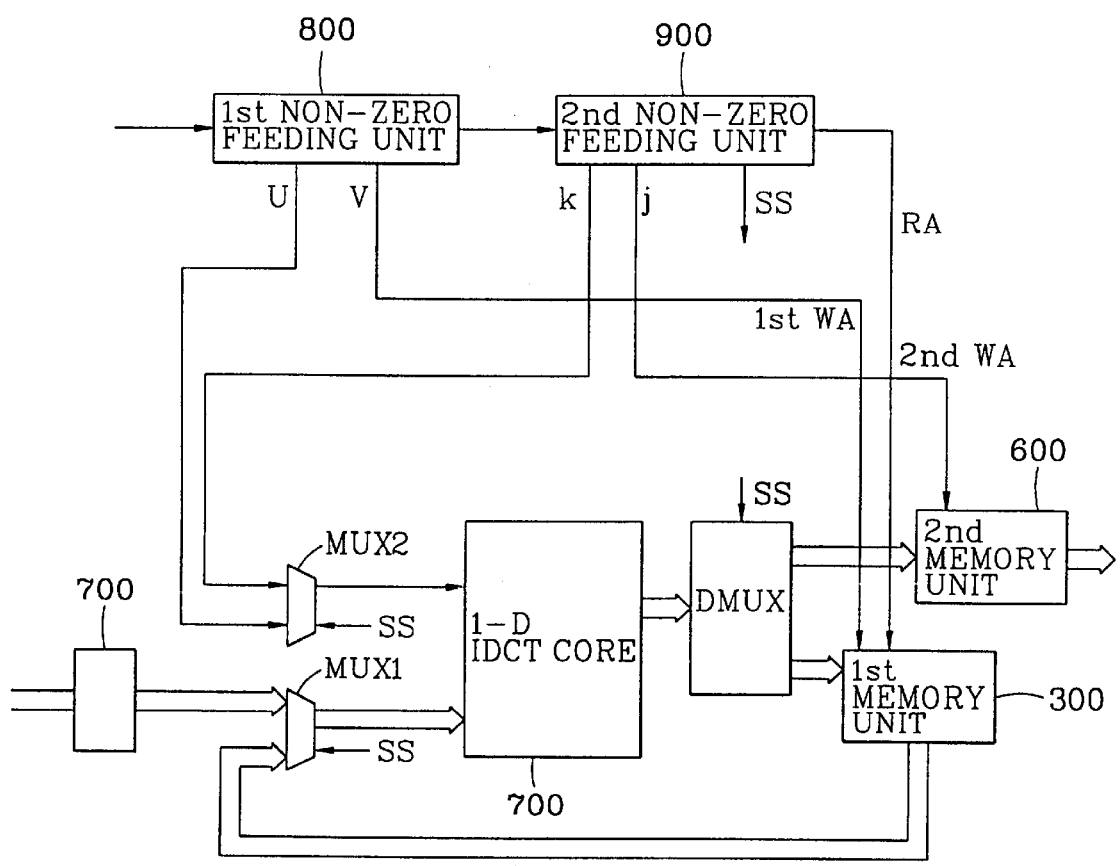
FIG. 11 is a block diagram illustrating an apparatus implementing IDCT according to a fourth embodiment of the present invention.

FIG. 11 is a block diagram illustrating an apparatus for implementing the IDCT operation according to the fourth embodiment of the present invention. As shown therein, the apparatus includes a first non-zero feeding unit 800, a second non-zero feeding unit 400, a first memory unit 300, a second memory unit 600, a 1-D IDCT core 700 for implementing the first and second 1-D IDCT operations, an input memory 710, two multiplexers mux1 and mux2, and a demultiplexer DMUX. The respective constructions of the input memory 710 and the first non-zero feeding unit 800 are identical to those of the third embodiment. Also, the second non-zero feeding unit 400, the 1-D IDCT core 700, the demultiplexer DMUX, and the first and second memory units 300, 600 are identical to those of the second embodiment.

In accordance with the select signal SS having a predetermined level from the second non-zero feeding unit 400, when the input data from the input memory 710 and the vertical position information "u" from the first non-zero feeding unit 800 are received, the 1-D IDCT core 700 performs the first 1-D IDCT in the same way as the performance of the third embodiment and outputs the resultant data.

When the first 1-D IDCT operation is completed, the second non-zero feeding unit 400 outputs the select signal SS inverted from the predetermined level. In accordance with the inverted select signal SS, when the resultant data of the first 1-D IDCT from the first memory unit 300 and the horizontal position information "k" from the second non-zero feeding unit 400 are applied, the 1-D IDCT core 700 performs the second 1-D IDCT operation and the accordingly resultant data is outputted to the second memory unit 600 via the demultiplexer DMUX.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. An apparatus for implementing an inverse discrete cosine transform (IDCT) in a digital image processing system, comprising:

a first non-zero feeding unit for storing therein a first position information of an inverse zigzag scanned non-zero input data;

a second non-zero feeding unit for receiving the first position information and storing therein a second position information of the inverse zigzag scanned non-zero input data;

a 1-D IDCT core for receiving the inverse zigzag scanned non-zero input data and performing a 1-D IDCT operation in accordance with the first or second position information; and a memory unit for storing therein 1-D IDCTed data values from the 1-D IDCT core.

2. The apparatus of claim 1, wherein the first position information is column information of the inverse zigzag scanned non-zero input data and the second position information is row information of the inverse zigzag scanned non-zero input data.

3. An apparatus for implementing an inverse discrete cosine transform (IDCT) in a digital image processing system, comprising:

an input memory for storing therein an inverse zigzag scanned non-zero input data in the form of a matrix according to a predetermined sequence, wherein the input memory stores therein the non-zero input data in an order of columns or rows;

a first non-zero feeding unit for storing therein a first position information of the input data;

a first 1-D IDCT core for receiving the non-zero input data from the input memory and performing a first 1-D IDCT operation in accordance with the first position information;

a first memory unit for storing therein first 1-D IDCTed data output from the first 1-D IDCT operation.

4. The apparatus of claim 3, wherein the first 1-D IDCT core performs the first 1-D IDCT operation in the order of columns or rows.

5. The apparatus of claim 3, wherein the first non-zero feeding unit comprises:

a column counter having numbers with regard to the input data in respective columns among the input data stored in the input memory;

an index register having the number of columns in which the input data exist; and an index counter having the number of a last column in which the input data exist.

6. The apparatus of claim 3, wherein the first 1-D IDCT core comprises:
   a first cosine kernel select unit for outputting the cosine kernel elements in a cosine kernel matrix in accordance with the first position information;
   a first multiplication unit for multiplying the cosine kernel elements and the non-zero input data; and
   a first addition unit for accumulating the multiplied value with the previously stored value.

7. The apparatus of claim 6, wherein the number of the cosine kernel column elements stored in the first cosine kernel select unit is one-half of the entire column elements in one cosine kernel column, and the first multiplication unit includes a number of multipliers which correspond to one-half of the column elements in number.

8. The apparatus of claim 3, wherein the apparatus further comprises:
   a second non-zero feeding unit for receiving the first position information and storing therein a second position information of the input data;
   a second 1-D IDCT core for receiving the first 1-D IDCTed data and performing a second 1-D IDCT operation in accordance with the second position information;
   a second memory unit for storing therein second 1-D IDCTed data output from the second 1-D IDCT operation.

9. The apparatus of claim 8, wherein the second non-zero feeding unit comprises:
   an index register having the number of columns in which the first 1-D IDCTed data value exists; and
   an index counter having the number of a last column in which the first 1-D IDCTed data value exists.

10. An apparatus for implementing an IDCT in a digital image processing system, comprising:
    an input memory for storing therein an inverse zigzag scanned non-zero input data in the form of a matrix according to a predetermined sequence;
    a first non-zero feeding unit for storing therein a first position information of the input data;
    a second non-zero feeding unit for receiving the first position information and storing therein a second position information of the input data; and
    a 1-D IDCT core for receiving the non-zero input data from the input memory and performing a 1-D IDCT operation in accordance with the first or second position information.

11. The apparatus of claim 10, wherein the apparatus further comprises:
    a first memory unit for storing therein a first 1-D IDCTed data value output from the 1-D IDCT operation performed according to the first position information;
    a second memory unit for storing therein a second 1-D IDCTed data value output from the 1-D IDCT operation performed according to the second position information;
    a first multiplexing means for selecting the input data from the input memory or the data from the first memory unit and outputting the selected data to the 1-D IDCT core; and
    a second multiplexing means for selecting the first or second position information and outputting the selected position information to the 1-D IDCT core.

12. The apparatus of claim 10, wherein the input memory stores therein the non-zero input data in an order of columns or rows, and the 1-D IDCT core performs the 1-D IDCT operation in the order of columns or rows.

13. The apparatus of claim 10, wherein the first non-zero feeding unit comprises:
    a column counter having numbers with regard to the input data in respective columns among the input data stored in the input memory;
    an index register having the number of columns in which the input data exist; and
    an index counter having the number of a last column in which the input data exist.

14. The apparatus of claim 10, wherein the second non-zero feeding unit comprises:
    an index register having the number of columns in which the first 1-D IDCTed data value exists; and
    an index counter having the number of a last column in which the first 1-D IDCTed data value exists.

15. The apparatus of claim 10, wherein the 1-D IDCT core comprises:
    a cosine kernel select unit for outputting the cosine kernel elements in a cosine kernel matrix in accordance with the position information;
    a multiplication unit for multiplying the cosine kernel elements and the non-zero input data; and
    an addition unit for accumulating the multiplied value with the previously stored value.

16. The apparatus of claim 10, wherein the first position information is column information of the inverse zigzag scanned non-zero input data and the second position information is row information of the inverse zigzag scanned non-zero input data.

17. An apparatus for implementing an IDCT in a digital image processing system, comprising:
    a first non-zero feeding unit for storing therein a first position information of an inverse zigzag scanned non-zero input data;
    a first 1-D IDCT core for receiving the inverse zigzag scanned non-zero input data and performing a first 1-D IDCT operation in accordance with the first position information; and
    a first memory unit for storing therein a first 1-D IDCTed data value output from the first 1-D IDCT operation and feeding back previously stored data to the first 1-D IDCT core when an accumulation is performed.

18. The apparatus of claim 17, wherein the 1-D IDCT core comprises:
    a first cosine kernel select unit for outputting the cosine kernel elements in a cosine kernel matrix in accordance with the first position information;
    a first multiplication unit for multiplying the cosine kernel elements and the non-zero input data; and
    a first addition unit for accumulating the multiplied value with the value fed back from the first memory.

19. The apparatus of claim 18, wherein the number of the cosine kernel column elements stored in the first cosine kernel select unit is one-half of the entire column elements in one cosine kernel column, and the first multiplication unit includes a number of multipliers which correspond to one-half of the column elements in number.

20. The apparatus of claim 17, wherein the apparatus further comprises:
    a second non-zero feeding unit for receiving the first position information and storing therein a second position information of the inverse zigzag scanned non-zero input data;

a second 1-D IDCT core for receiving the first 1-D IDCTed data value and performing a second 1-D IDCT operation in accordance with the second position information;

a second memory unit for storing therein a second 1-D IDCTed data value output from the second 1-D IDCT operation.

21. The apparatus of claim 20, wherein the second non-zero feeding unit comprises:

an index register having the number of columns in which the first 1-D IDCTed data value exists; and an index counter having the number of a last column in which the first 1-D IDCTed data value exists.

22. The apparatus of claim 20, wherein the first position information is column information of the inverse zigzag scanned non-zero input data and the second position information is row information of the inverse zigzag scanned non-zero input data.

23. An apparatus for implementing an IDCT in a digital image processing system, comprising:

a first non-zero feeding unit for storing therein a first position information of an inverse zigzag scanned non-zero input data;

a second non-zero feeding unit for receiving the first position information and storing therein a second position information of the inverse zigzag scanned non-zero input data;

a 1-D IDCT core for receiving the inverse zigzag scanned non-zero input data and performing a 1-D IDCT operation in accordance with the first or second position information; and a first memory unit for storing therein the a 1-D IDCTed data value output from the 1-D IDCT operation performed according to the first position information and feeding back previously stored data to the 1-D IDCT core when an accumulation is performed.

24. The apparatus of claim 23, wherein the apparatus further comprises:

a second memory unit for storing therein a second 1-D IDCTed value output from the 1-D IDCT operation performed according to the second position information;

a first multiplexing means for selecting the non-zero input data or the data from the first memory unit and outputting the selected data to the 1-D IDCT core; and a second multiplexing means for selecting the first or second position information and outputting the selected information to the 1-D IDCT core.

25. The apparatus of claim 23, wherein the second non-zero feeding unit comprises:

an index register having the number of columns in which the first 1-D IDCTed data value exists; and an index counter having the number of a last column in which the first 1-D IDCTed data value exists.

26. The apparatus of claim 23, wherein the 1-D IDCT core comprises:

a cosine kernel select unit for outputting the values of the cosine kernel elements in a cosine kernel matrix in accordance with the position information;

a multiplication unit for multiplying the cosine kernel elements and the non-zero input data; and an addition unit for accumulating the multiplied value with the previously stored value.

27. The apparatus of claim 23, wherein the first position information is column information of the inverse zigzag scanned non-zero input data and the second position information is row information of the inverse zigzag scanned non-zero input data.

* * * * *